United States Patent [19]
Dalton

[11] Patent Number: 5,362,072
[45] Date of Patent: Nov. 8, 1994

[54] TURBINE RADIAL ADJUSTABLE LABYRINTH SEAL

[75] Inventor: William S. Dalton, Chesterfield, Mass.

[73] Assignee: IMO Industries, Inc., Quabbin Division, Chicopee, Mass.

[21] Appl. No.: 993,431

[22] Filed: Dec. 21, 1992

[51] Int. Cl.⁵ ............................................. F16J 15/447
[52] U.S. Cl. ........................................ 277/53; 277/54; 415/173.2; 415/173.5; 415/174.1; 415/174.5
[58] Field of Search ............... 277/53, 54, 126, 129, 277/147; 415/173.2, 173.5, 174.1, 174.5

[56] References Cited

U.S. PATENT DOCUMENTS

| | | |
|---|---|---|
| 872,396 | 12/1907 | Wilkinson . |
| 924,897 | 6/1909 | Emmet ............................ 277/54 |
| 957,286 | 5/1910 | Wilson . |
| 957,887 | 5/1910 | Junggren . |
| 1,006,714 | 4/1910 | Bell ................................ 277/53 |
| 1,792,288 | 2/1931 | Dempster . |
| 3,019,035 | 1/1962 | Klompas . |
| 3,155,395 | 11/1964 | Hoffman ......................... 277/53 |
| 3,357,708 | 12/1967 | Parr . |
| 3,865,504 | 2/1975 | Benz ............................ 277/53 X |
| 3,867,060 | 2/1975 | Huber . |
| 3,971,563 | 7/1976 | Sugimura . |
| 4,103,905 | 8/1978 | Desmond . |
| 4,330,133 | 5/1982 | Palfreyman et al. . |
| 4,629,197 | 12/1986 | Schütte et al. .................. 277/53 |
| 4,792,277 | 12/1988 | Dittberner, Jr. et al. ... 415/174.5 X |
| 4,995,620 | 2/1991 | Zawaski et al. . |
| 5,208,043 | 5/1993 | Gatarz et al. ............... 277/34 X |

FOREIGN PATENT DOCUMENTS

| | | | |
|---|---|---|---|
| 587922 | 11/1933 | Germany ........................ 277/53 |
| 277806 | 9/1927 | United Kingdom ............. 277/53 |
| 763373 | 12/1956 | United Kingdom ............. 277/53 |
| 299660 | 3/1972 | U.S.S.R. ........................ 277/54 |

*Primary Examiner*—Scott W. Cummings
*Attorney, Agent, or Firm*—Ross, Ross & Flavin

[57] ABSTRACT

In an elastic fluid turbine employing packing rings and spill strips or tip seals to minimize leakage between rotating and stationary components, an improvement in the packing rings and spill strips utilizing the combination of: interconnected first and second half parts, the first half part being disposed in an annular groove formed in a stationary component of the turbine, the second half part being partially disposed in a clearance area between the stationary and rotating components, the second half part having at least one seal tooth extending therefrom and contacting the rotating component, shims for selectively varying the spacing between the half parts for adjusting the sealing dimensions of the packing ring and seal strip, and bolts for interconnecting the half parts to form an integral, inseparable unit.

8 Claims, 2 Drawing Sheets

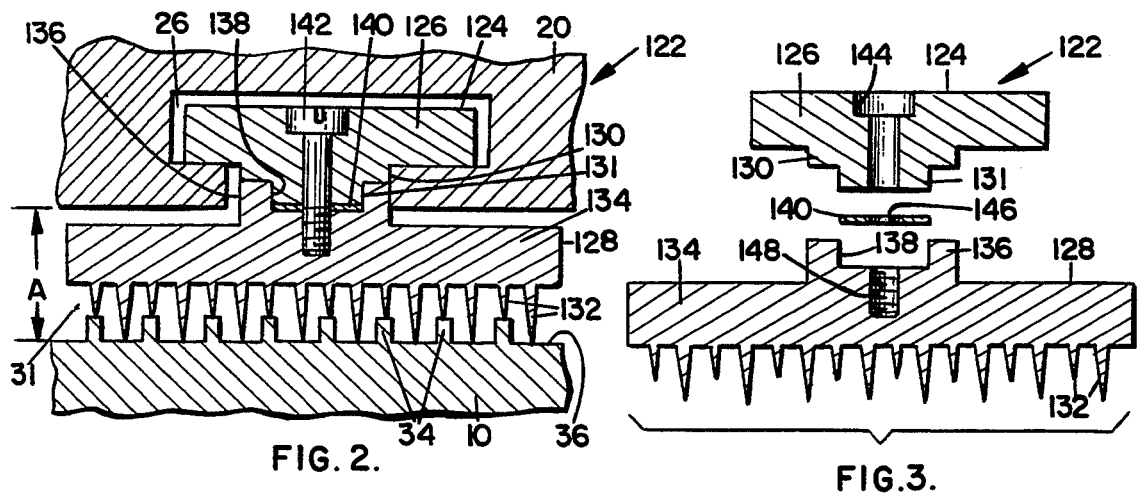
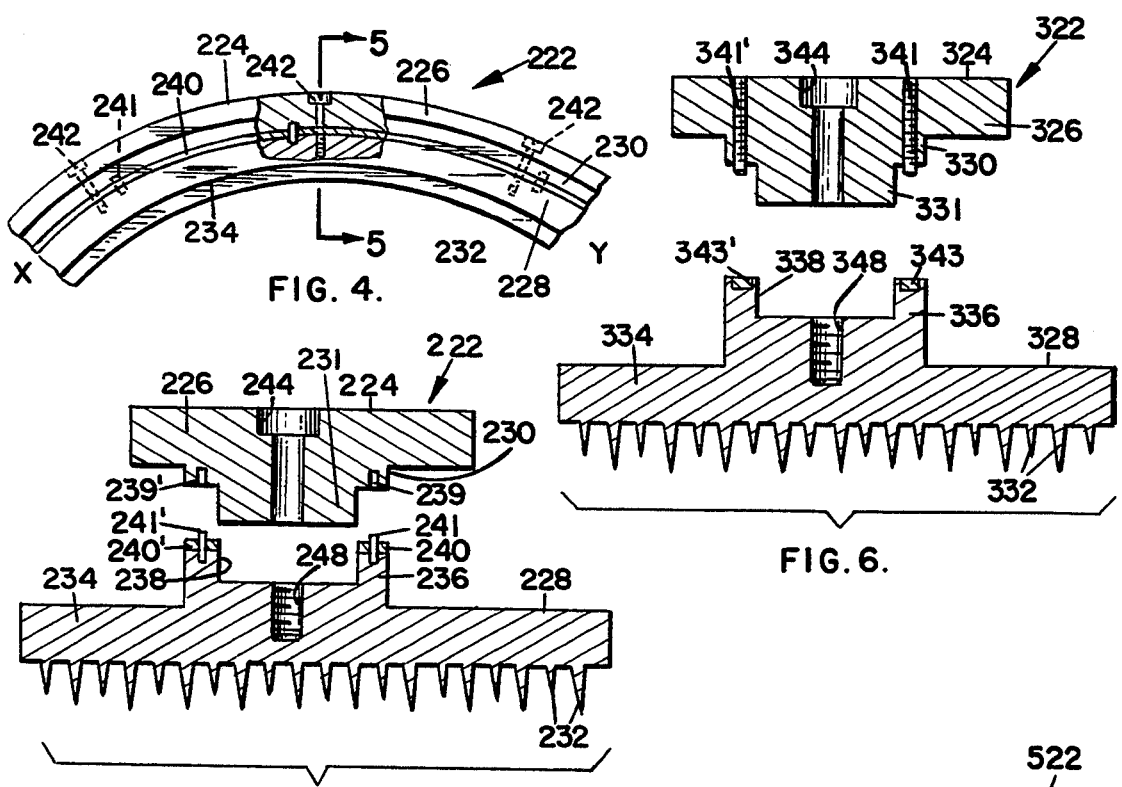
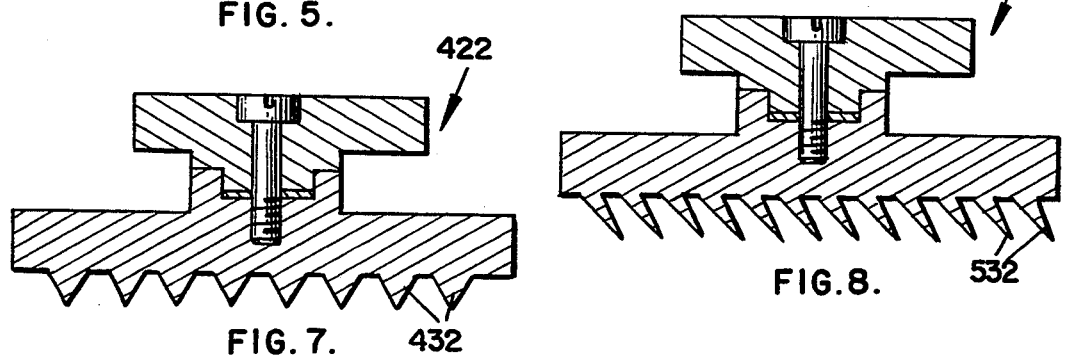

TURBINE RADIAL ADJUSTABLE LABYRINTH SEAL

BACKGROUND OF THE INVENTION

1. Field of the Invention

The invention relates to sealing means such as packing and tip seals for the diaphragm and other stationary parts of an elastic fluid axial flow turbine. Such sealing means are arranged both where rotatable shafts penetrate stationary turbine casings and in addition, internal to the casings between stages and turbine sections. The sealing means prevent or reduce leakage of the fluid by creating small clearance areas with low flow coefficients between the rotating and stationary parts.

A typical steam turbine diaphragm consists of the shaft packing, nozzles, and spill strips or tip seals. Historical data collected has indicated that in most units inspected, the radial spill strips were rubbed approximately 50% more than the shaft packing. The spill strip design essentially holds the seal rigidly in place, whereas the shaft packing are spring-backed, allowing the packing ring segments to back away from the shaft to some degree.

Reductions in steam turbine efficiency and performance are primarily caused by four mechanisms:
1. Chemical deposits in the turbine steam path;
2. Erosion on nozzle and bucket surfaces;
3. Mechanical damage to nozzles and buckets from foreign material; and
4. Steam leakage through shaft packing rings and tip seals.

Assuming proper alignment of the diaphragms and rotor, packing and tip seal rubs are usually the result of thermal distortion. Thermal distortion is most prevalent during transient operating conditions, such as turbine start-up.

Leakage problems are presented by out of round diaphragms or misaligned rotors.

2. Description of the Prior Art

The packing and tip seals of the prior art are unsuitable for use with turbines having out of round diaphragms or misaligned rotors.

To my knowledge, all of the packing or tip seals are of rigid one piece construction so as not to provide suitable sealing means when turbine parts are not true, are out of round, or are misaligned.

SUMMARY OF THE INVENTION

It is a primary object of the invention to provide sealing means such as two part packing rings and tip seals each comprising separate half parts and means for selectively varying the spacing between the half parts for adjusting the sealing dimensions of the packing and tip seals.

The means for selectively varying the spacing between the half parts may be a shim or shims, or adjusting screws on one half part bearing against hardened steel pads on the other half part.

BRIEF DESCRIPTION OF THE DRAWINGS

FIG. 2 is a fragmentary cross sectional view of a radial adjustable packing embodying a preferred form of the invention positioned between a turbine rotor and stationary component;

FIG. 3 is an exploded cross sectional view of the FIG. 2 packing;

FIG. 4 is a fragmentary side elevational view of a radial adjustable packing embodying a first modified form of the invention, with parts broken away for clarity;

FIG. 5 is an exploded cross sectional view of the FIG. 4 packing taken on the line 5—5 of FIG. 4;

FIG. 6 is an exploded cross sectional view of a radial adjustable packing embodying a second modified form of the invention;

FIG. 7 is a cross sectional view of a radial adjustable packing embodying a third modified form of the invention;

FIG. 8 is a cross sectional view of a radial adjustable packing embodying a fourth modified form of the invention;

DESCRIPTION OF THE PREFERRED EMBODIMENTS

Figure 1:
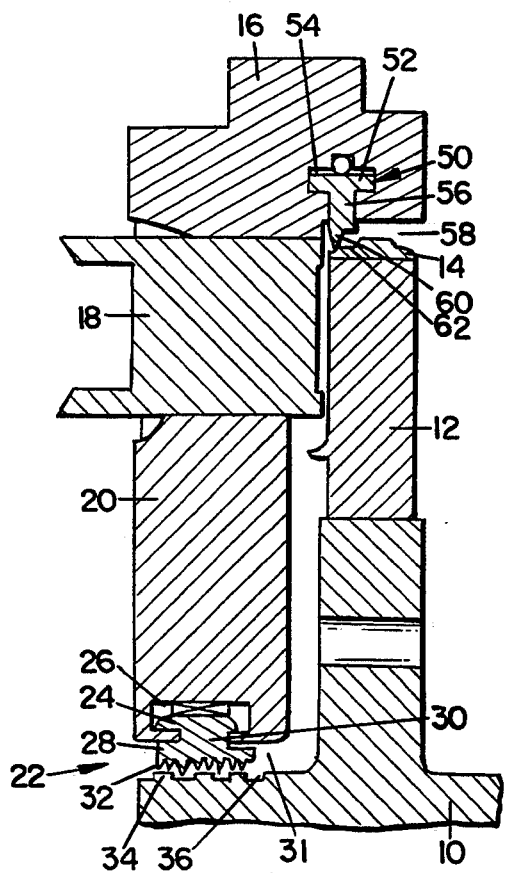
FIG. 1 is a horizontal cross sectional view of a typical prior art axial flow elastic turbine showing portions of the diaphragm, other stationary and rotating components and a typical prior art packing and tip seal.

Referring to FIG. 1, a turbine includes the usual rotating components comprising a rotor 10, rotor blading 12 and shroud band 14, which operate in adjacency to stationary or fixed components comprising a diaphragm 16, bucket 18, and nozzle 20.

A typical prior art unitary packing ring 22 has an upper portion 24 which is retained in a T-shaped groove 26 in nozzle 20 and a lower portion 28 connected by a neck 30 to upper portion 24 and depending from the nozzle into a free space 31 between the nozzle and rotor 10.

Lower portion 28 of packing ring 22 includes a plurality of stepped depending teeth 32 that are disposed in opposition to circumferential portions 34 and 36 of the rotor which are alternately stepped up and down in radius.

A typical prior art unitary tip seal 50 has an upper portion 52 which is retained in a T-shaped groove 54 in diaphragm 16 and a lower portion 56 which depends from upper portion 52 into a free space 58 between the diaphragm and shroud band 14.

Lower portion 56 of tip seal 50 has a depending tooth 60 disposed in opposition to a land 62 on shroud band 14 of rotor blading 12.

The prior art unitary packing ring 22 and unitary tip seal 50 are virtually ineffective to prevent steam leakage when diaphragm 16 becomes out of round or the rotor 10 becomes misaligned.

Such defects are cured by the two-part packing rings and spill strip or tip seal of the invention.

As best seen in FIGS. 2 and 3, a two-part packing ring 122 embodying a preferred form of the invention includes a T-shaped upper half part 124 which is of appropriate size and configuration for disposition in groove 26 of nozzle 20 and an inverted T-shaped lower half part 128 which is of appropriate size and configuration for disposition in free space 31 between the nozzle and rotor 10, with staggered teeth 132 depending from the lower face of lower half part 128 in opposition to steps 34 and lands 36 of rotor 10.

Upper half part 124 includes a body portion 126 having an integral depending central shoulder 130 and neck 131.

Lower half part 128 includes a body portion 134 from which teeth 132 depend, and having an integral upright central boss 136 on its upper face with a central groove 138 therein.

Before half parts 124 and 128 are joined, a flat shim 140 of desired thickness is placed in groove 138 of lower half part 128; neck 131 of upper half part 124 is then placed in groove 138 of lower half part 128 so that the lower end of the neck rests on shim 140 and shoulder 130 of the upper half part rests on boss 136 of the lower half-part.

The half parts are secured together by a plurality of vertically-disposed screws or bolts 142, only one of which is shown in FIG. 2, which extend through provided openings 144 in upper half part 124, through provided openings 146 in shim 140 and are threadedly engaged in threaded openings 148 which extend vertically into boss 136 below groove 138 in lower half part 128.

The heads of screws or bolts 142 are preferably peened to insure against their unwanted loosening, escape of shim 140, or separation of the half parts.

By the addition of shim 140 at assembly, the dimension A in FIG. 2 provides as tight a clearance between nozzle 20 and rotor 10 as desired, with the thickness of the shim determining the tightness of the clearance.

In the modified form of FIGS. 4 and 5, a packing 222 includes a T-shaped upper half part 224 and an inverted T-shaped lower half part 228, with teeth 232 depending from the lower face of the lower half part.

As with packing 122 of FIGS. 2 and 3, packing 222 is associated with a turbine, not shown, and is disposed in a groove of the turbine nozzle and depends from the nozzle into the free space between the nozzle and rotor.

Upper half part 224 includes a body portion 226 having an integral depending central shoulder 230 and neck 231.

Lower half part 228 includes a body portion 234 from which teeth 232 depend, and having an integral upright central boss 236 on its upper face with a central groove 238 therein.

On one side of neck 231 of upper half part 224 shoulder 230 has a plurality of spaced openings 239 extending upwardly therein.

On the other side of neck 231, shoulder 230 has a plurality of spaced openings 239' extending upwardly therein.

A plurality of dowel pins 241 are fixed in central boss 236 of lower half part 228 along one side edge of groove 238 and extend vertically upwardly therefrom, dowel pins 241 being of appropriate spacing as to be receivable in openings 239 in shoulder 230 of upper half part 224 when the half parts are mated.

A plurality of dowel pins 241' are fixed in central boss 236 of lower half part 228 along the opposite side edge of groove 238 and extend vertically upwardly therefrom, dowel pins 241' being of appropriate spacing as to be receivable in openings 239' in shoulder 230 of upper half part 226 when the half parts are mated.

Before half parts 224 and 228 are mated, a flat shim 240 of any desired thickness having a plurality of openings therein spaced to correspond to the spacing between pins 241 on boss 236 of lower half part 228 is placed on pins 241 so as to rest on the upper face of boss 236.

A flat shim 240', of the same or different thickness than that of shim 249 having a plurality of openings therein spaced to correspond to the spacing between pins 241' on boss 236 of lower half part 228 is placed on pins 241' so as to rest on the upper face of boss 236.

Shims 240 and 240' are disposed in spaced parallelism, one on each side of groove 238 in lower half part 228.

Half parts 224 and 228 are secured together by a plurality of vertically-disposed screws or bolts 242, which extend through provided openings 244 in upper half part 224 and are threadedly engaged in threaded openings 248 in lower half part 228. The heads of the screws or bolts are preferably peened to preclude separation of the half parts.

Shims 240 and 240' of different thickness can be used to compensate for a misshaped turbine nozzle or for a misaligned turbine rotor.

For instance, using a 0.015 shim at X in FIG. 4 and a 0.040 shim at Y, will compensate for a misshapened nozzle.

Also, using a shim 240 of 0.040 thickness and a shim 240' of 0.010 thickness will compensate for a misaligned rotor.

In the modified form of FIG. 6, a packing 322 includes a T-shaped upper half part 324 and an inverted T-shaped lower half part 328 with teeth 332 depending from the lower face of the lower half part.

As with packings 122 and 222, packing 322 is associated with a turbine, not shown, and is disposed in a groove of the turbine nozzle and depends from the nozzle into the free space between the nozzle and rotor.

Upper half part 324 includes a body portion 326 having an integral depending central shoulder 330 and neck 331.

Lower half part 328 includes a body portion 334 from which teeth 332 depend, and having an integral upright central boss 336 on its upper face with a central groove 338 therein.

A row of spaced, vertically extending adjusting screws 341, only one of which is shown, is threadedly engaged in and extends through body portion 326 and shoulder 330 on one side of neck 331 of upper half part 324, screws 341 having a lower free end which depends below the plane of the lower face of shoulder 330.

A row of spaced, vertically extending adjusting screws 341', only one of which is shown, is disposed in spaced parallelism to adjusting screws 341 and is threadedly engaged in and extends through body portion 326 and shoulder 330 on the opposite side of neck 331 of upper half part 324, screws 341' having a lower free end which depends below the plane of the lower face of shoulder 330.

In lower half part 328, a plurality of spaced hardened steel pads 343 are fixed in central boss 336 along one side edge of groove 338, pads 343 being of appropriate spacing as to be disposed immediately below adjusting screws 341 of upper half part 324 when the half parts are mated.

A plurality of spaced hardened steel pads 343' are fixed in central boss 336 along the opposite side edge of groove 338 of lower half part 328, pads 343' being of appropriate spacing as to be disposed immediately below adjusting screws 341' of upper half part 324 when the half parts are mated.

Half parts 324 and 328 are secured together by a plurality of vertically-disposed screws or bolts, not shown, which extend through provided openings 344 in upper half part 324 and are threadedly engaged in the threaded openings 348 in lower half part 328. The heads of the bolts or screws are preferably peened to preclude separation of the half parts.

By rotation of adjusting screws 341 and/or 341', the spacing between half parts 334 and 338 can be adjusted to adjust critical clearances between the turbine parts.

In the modified forms of FIGS. 7 and 8, packings 422 and 522 respectively are identical to packing 122 of FIGS. 2 and 3, except that teeth 432 of FIG. 7 are in line as opposed to being staggered, while teeth 532 of FIG. 8 are angled or slanted.

As with the other forms of packings of the invention, packings 422 and 522 are associated with a turbine, not shown, and are disposed in a groove of the turbine nozzle and depend from the nozzle into the free space between the nozzle and rotor.

Figure 9:
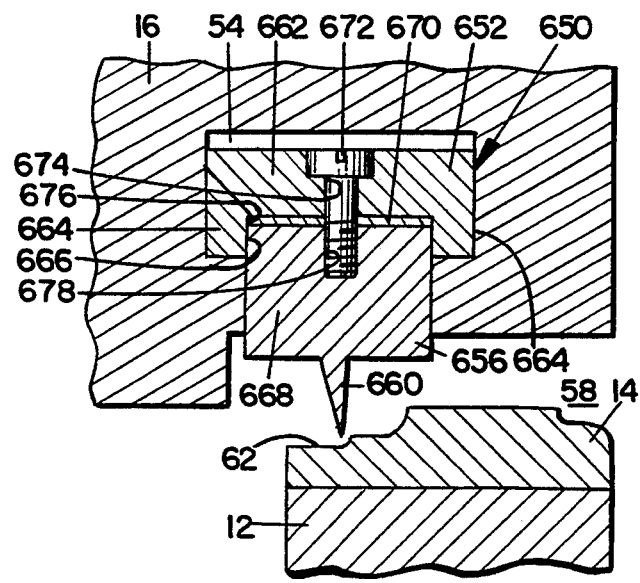
FIG. 9 is a fragmentary cross-sectional view of a radial adjustable spill strip or tip seal embodying the invention positioned between a turbine stationary diaphragm and rotating rotor shroud band.
Figure 10:
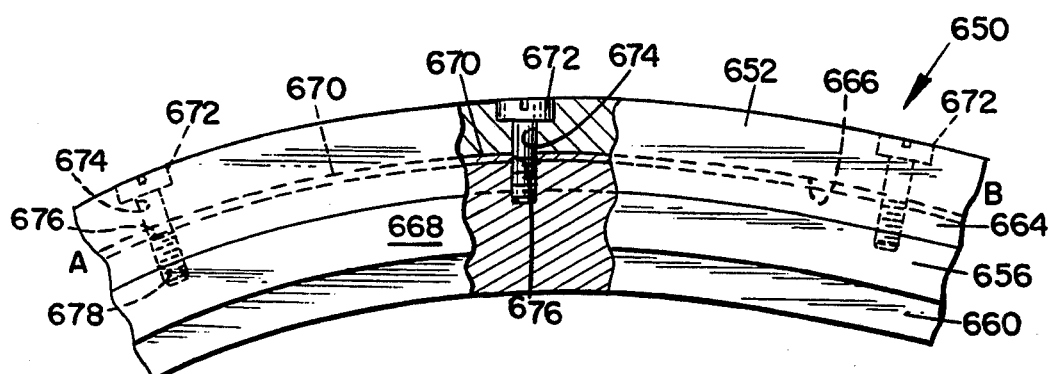
FIG. 10 is a side elevational view of the FIG. 9 spill strip or tip seal, with parts broken away for clarity.

In FIGS. 9 and 10, the invention is shown as applied to a two-part spill strip or tip seal 650.

Spill strip or tip seal 650 includes an inverted U-shaped upper half part 652 and a square or rectangular lower half part 656, with a tooth 660 depending from the lower face of the lower half part.

Spill strip or tip seal 650 is associated with a turbine and is disposed in groove 54 of the turbine diaphragm 16 and depends from the diaphragm into free space 58 between the diaphragm and rotor shroud band 14, with tooth 660 disposed in opposition to land 62 of the shroud band.

Upper half part 652 includes a body portion 662 having integral, spaced, parallel shoulders 664 depending from the opposite front and rear faces thereof to define a groove 666 on the lower face of the half part.

Lower half part 656 includes a square or rectangular body portion 668 of appropriate dimensions so as to fit snugly in groove 666 between shoulders 664 of upper half part 652 when the parts are mated and to depend below the plane of the lower faces of shoulders 664.

Before half parts 652 and 656 are mated, a flat shim 670 of any desired thickness is placed on the upper face of body portion 668 of lower half part 652, so as to be disposed between the half parts and confined within groove 666 of the upper half part when the half parts are mated.

The half parts are secured together by a plurality of vertically-disposed screws or bolts 672, which extend through provided openings 674 in upper half part 652, through provided openings 676 in shim 670 and are threadedly engaged in threaded openings 678 in lower half part 656. The heads of screws or bolts 672 are preferably peened to preclude separation of the half parts.

Shims 670 of various thicknesses or of varying thickness can be employed to adjust critical clearances between diaphragm 16 and shroud band 14 of rotor blade 12.

The shims may increase or decrease in thickness throughout their length.

For example, as seen in FIG. 10, shim 670 decreases in thickness from point A to point B.

Alternatively, the shim may increase in thickness between those points.

Spill strip or tip seal 650 may have more than one tooth 660 and the tooth or teeth may be slanted or angled.

I claim:

1. In an elastic fluid turbine employing packing rings and spill strips or tip seals to minimize leakage between rotating and stationary components, an improvement in the packing rings and spill strips utilizing the combination of:

a two-part packing ring and a two-part spill strip each comprising interconnected separate first and second half parts, the first half parts being disposed in annular grooves formed in stationary components of the turbine, the second half parts being partially disposed in clearance areas between the stationary components and rotating components, the second half parts having at least one seal tooth extending therefrom and disposed in close proximity to the rotating components, means for selectively varying the spacing between the half parts for adjusting the sealing dimensions of the packing ring and spill strip, and means for interconnecting the half parts to form an integral inseparable unit, the means for selectively varying the spacing between the half parts being a shim positioned in a groove in a lower face of the first half part, the second half part having an upper face bearing against the shim when the parts are mated.

2. In an elastic fluid turbine according to claim 1, wherein the means for selectively varying the spacing between the half parts is a shim positioned in a groove in an upper face of the second half part, the first half part having a lower face bearing against the shim when the parts are mated.

3. In an elastic fluid turbine according to claim 1, wherein the means for selectively varying the spacing between the half parts is a pair of spaced shims positioned on dowel pins on the second half part, the dowel pins being receivable in aligned openings in the first half part when the parts are mated.

4. In an elastic fluid turbine according to claim 3, the spaced shims being the same thickness.

5. In an elastic fluid turbine according to claim 3, the spaced shims being of different thicknesses.

6. In an elastic fluid turbine according to claim 1, wherein the means for selectively varying the spacing between the half parts is a pair of spaced adjusting screws on the first half part for bearing against hardened steel pads on the second half part when the parts are mated.

7. In an elastic fluid turbine according to claim 1, wherein the means for selectively varying the spacing between the half parts is a shim positioned between the half parts, the shim being of increasing thickness throughout its length.

8. In an elastic fluid turbine according to claim 1, wherein the means for selectively varying the spacing between the half parts is a shim positioned between the half parts, the shim being of decreasing thickness throughout its length.

* * * * *